March 20, 1945.  E. W. MILLER ET AL  2,371,702
MACHINE FOR GENERATING SPIRAL FACE GEARS
Filed Jan. 7, 1942  3 Sheets-Sheet 1

Inventors:
Edward W. Miller
Arthur L. Bean

March 20, 1945.    E. W. MILLER ET AL    2,371,702
MACHINE FOR GENERATING SPIRAL FACE GEARS
Filed Jan. 7, 1942    3 Sheets-Sheet 3

Inventors:
Edward W. Miller
Arthur I. Bean

Patented Mar. 20, 1945

2,371,702

UNITED STATES PATENT OFFICE 2,371,702

MACHINE FOR GENERATING SPIRAL FACE GEARS

Edward W. Miller and Arthur I. Bean, Springfield, Vt., assignors to The Fellows Gear Shaper Company, Springfield, Vt., a corporation of Vermont Application January 7, 1942, Serial No. 425,826

24 Claims. (Cl. 90—7)

The principal object of the present invention is to furnish means for generating face gears of which the teeth are arranged otherwise than at equal distances from a central point or axis. One specific type of gear in the category referred to has teeth arranged in a spiral of several turns on the plane face of a disk. Such gears heretofore have been made as die castings and the teeth are truncated cones, all alike as to form and dimensions, spaced equally apart on a spiral pitch line.

The problem solved with the accomplishment of the foregoing object was to generate in or on the face of a disk-like gear element, teeth arranged in a spiral, or other non-circular, pitch line which are accurately conjugate to a given spur or helical pinion. In solving this problem we have employed the molding principle of gear generation, using, in certain embodiments of the invention, a rotative and reciprocatory gear shaped planing cutter, and have provided means for effecting harmonious rotation of the gear blank and cutter and a relative displacement between the blank and cutter in accordance with the different radial distances of different parts of the tooth bearing zone of such blank from its axis; in combination with means for effecting a relative reciprocating cutting traverse between the cutter and blank.

Mechanical means and mechanisms have been developed in the accomplishment of the foregoing object which, with but slight rearrangements, may be used for generating other irregular gears than purely face gears; that is, external or internal gears, of either spur or helical character, of which different teeth are at different distances from the axes, capable of meshing with other gears and pinions in parallel-axis arrangement.

Some of the possible embodiments of the means above referred to are explained in the following specification with reference to illustrative drawings.

In the drawings.

Like reference characters designate the same parts wherever they occur in all the figures.

Figure 1:
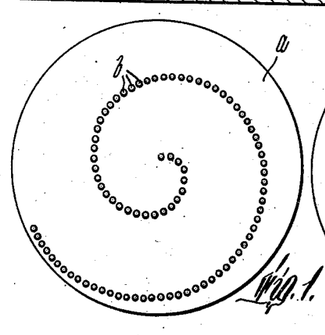
Fig. 1 is a face view of a spiral face gear of the type heretofore used.

The face gear shown in Fig. 1 is a disk $a$ having on one plane face thereof a series of teeth $b$ in spiral arrangement. These teeth are circular in end view and have a tapered profile with their largest diameter contiguous to the face of the disk. In other words, they are truncated cones. Gears of this type have been made commercially and incorporated in mechanisms for cooperation with spur pinions. Up to the present time no method has been known for making such gears in commercial quantities at tolerable cost except that of die casting. While teeth so formed and constructed certainly do operate to transmit rotation to and from meshing pinions, yet they leave much to be desired in the way of uniformity and smoothness of gear action with the meshing pinions, smoothness of surface finish and long wearing qualities.

Figure 2:
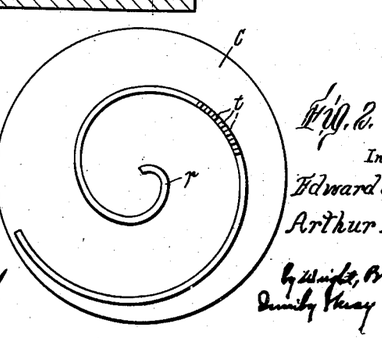
Fig. 2 is a similar view of a face gear made in accordance with the present invention having spirally arranged teeth conjugate to a spur pinion.

In accordance with the present invention we have made possible the accurate generation of face gear teeth in any spiral or other desired non-circular arrangement having faces which are accurately conjugate to the teeth of either spur or helical pinions, as may be desired, and which may be made of any metal, metal alloy, or other composition or material which is capable of being cut by metal cutting tools and is otherwise serviceable for use as a gear element. The teeth so fashioned have the smoothness of surface finish characteristic of cut gears and the wear resisting qualities characteristic of the metal or other composition from which they are fashioned. Preferably they are cut in a raised rib protruding from a face of the gear blank, although it is within our contemplation to make them flush with the face of the gear by cutting tooth spaces below the plane of such face at the proper locations. An illustrative face gear made according to the invention is shown in Fig. 2 and is designated $c$. Its teeth are designated $t$. They are arranged in a spiral of the same outline as that of the gear *a* in Fig. 1 for convenience of comparison.

All the forms of machine shown in the accompanying drawings as illustrative embodiments of the invention employ a reciprocating and rotating planing cutter having peripheral teeth similar to gear teeth provided with cutting edges at one end; the pitch and pressure angle of such teeth being the same as those of the pinions or gears with which the face gears to be generated are designed to mesh. Such cutter is designated C in the drawings. It is reciprocated in the direction of its axis, for cutting, and rotated about its axis for generating the prescribed tooth forms in the work. The work piece, or face gear blank, designated W in the drawings of the machine, is rotated in harmony with the rotation of the cutter and is at the same time displaced with respect to the location in which the cutter performs its reciprocating movements, in equal measure to the different distances of successive teeth from the center or axis of the blank. Means for effecting such a relative displacement between the work and cutter, and means for correlating the rotation of the work with that of the cutter are vital factors novel with the present invention. Their combination with other features, already known in the gear cutting art, are likewise vital novel combinations. A number of possible alternative means for controlling the rotation of work and cutter are shown in these drawings in combination with illustrative means for carrying on the other operations of the machine.

Figures 3, 4:
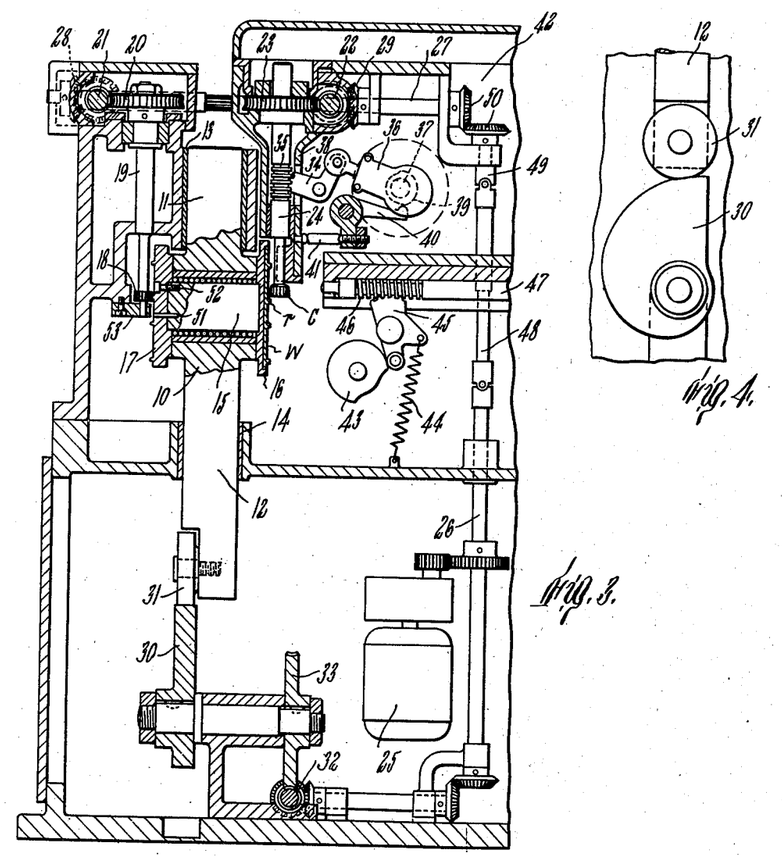
Fig. 3 is a vertical sectional view, somewhat diagrammatic in character, of a gear generating machine adapted to make spiral face gears such as that shown in Fig. 2.
Fig. 4 is a fragmentary elevation showing in face view the cam employed in the machine of Fig. 3 for controlling the progressive displacement between the work piece and cutter radially of the former.

Referring now to Figs. 3 and 4, a work holder or slide 10 is provided with massive rigid upper and lower extensions 11 and 12 fitted to slide in guideways 13 and 14 respectively in the machine frame, and in which they are non-rotatable. They may be prevented from rotation in the guideways by various means well known in the art, as by giving them a non-circular shape in cross section, providing splines and keyways, etc. A work spindle or shaft 15 is mounted rotatably in the holder 10, with its axis transverse to the path of movement of the holder and to the axis of the cutter, and carries on one end a chuck 16 in which the work piece is mounted. The other end of this shaft carries a master gear 17 which constitutes one element of means for correlating the rotation of the work piece with the rotation of the cutter. The cooperating parts for this purpose comprise a pinion 18, meshing with the master gear and carried by a shaft 19, a worm wheel 20 fixed to shaft 19, a worm 21 meshing with worm wheel 20, and a train of gearing between the worm 21 and a worm 22 which drives a worm gear 23 through which the cutter spindle 24 is adopted to slide endwise and with which it has a rotation-transmitting connection. By way of illustration, a motor 25 is shown here as mounted in the base of the machine, driving a shaft 26 through reduction gearing, and shaft 26 drives a transverse shaft 27 which drives the worms 21 and 22 through bevel gear pairs 28 and 29, respectively.

The movement of the work holder 10 is controlled by a cam 30 against which a follower roll 31 mounted on the lower extension 12 of the slide bears, and is held by gravity. The cam is rotated at a speed proportional to that of the master gear 17 by worm and wheel gearing 32, 33 and transmission gearing from the shaft 26 substantially as shown. In this illustration, the operating surface of cam 30 extends through less than 360°, while the spiral of the face gear teeth extends through considerably more than 360°. The outline and speed ratio of the cam are established pursuant to known principles of machine design so that the work holder and work will descend or rise, as the case may be, at a rate in proportion to the rotation of the work such that each point in the spiral line of teeth, when it arrives beside the cutter, will be between the limits of reciprocation of the cutter.

With the arrangement shown, the work holder is at its highest point at the commencement of the cutting operation, and the operation is begun at the innermost end of the spiral; the holder being then gradually lowered as the cutting proceeds. But either of these conditions may be reversed. That is, the cutting action may be commenced at the outer end of the spiral, and the holder may be raised with progress of the cutting from that end. It is obvious also that other cams may be substituted, including those having a spiral surface or groove extending throughout an entire convolution or a number of convolutions. When teeth are cut in a closed non-circular circuit, a cam is employed which causes both rise and descent (or vice versa) of the work holder in the course of the cycle.

Other parts of the machine shown are in substance like corresponding parts of the standard Fellows gear shaping machine. Thus the cutter spindle 24 is reciprocated by a gear segment 34 meshing with encircling rack teeth 35 on the spindle and reciprocated by a connecting rod 36 from a crank on a shaft 37 driven by the motor 25 through gearing (not shown) or a separate motor if desired. In so reciprocating, a guide element carried by the spindle slides in contact with a complemental guide element in the hub of worm wheel 23. These guide elements are parallel with the axis of the spindle when the machine is set up to generate face gear teeth conjugate to spur gears; and helical guide elements are used in generating face gears conjugate to helical pinions. Guides of these characters are shown and described in the Fellows Patent No. 676,227, June 11, 1901.

The cutter is backed off from the work to avoid rubbing during its non cutting strokes, and is held in a fixed path while making its cutting strokes. To permit of such movements a saddle 38, which contains the spindle 24 and worm wheel 23, is pivoted to swing through a small angle around the axis of worm 22, and it is forced away from the work by a spring (not shown) and toward the work by a cam 39 on shaft 37 acting through a lever 40 and transmission rod 41. Saddle 38 and the shafts 37 and 27 are supported by a carriage 42 which has sliding movement on the base toward and away from the work holder 10 for feeding the cutter to depth in the work (when the character of the work requires such a feed) and for withdrawing the cutter to provide space for changing the work. Such movements are given to the carriage by means of a depth feed cam 43 and spring 44 acting through a gear segment 45 and a rack element 46 on the carriage. This depth feeding mechanism is in principle like that of the Fellows Patent No. 1,478,472, December 25, 1923, and the feed cam may be driven from the motor 25 or shaft 26 by any appropriate mechanism. Preferably the teeth of rack 46 collectively form a helical thread surrounding a rotatable bar 47 mounted in the carriage, which bar can be rotated to alter the position of the carriage in accordance with cutters and work pieces of different dimensions. To maintain driving connection between shafts 26 and 27 in different positions of the carriage, the shaft 26 is coupled by a telescopic shaft section 48 and universal joints with a shaft section 49 mounted in the carriage and connected by gearing 50 with shaft 27. Shaft 27 is in splined sliding connection with the driving member of the gear pair 28; and extends far enough to maintain such engagement in all positions of the carriage.

Depth feeding of the cutter is not necessary in all cases. For instance, when teeth are cut in a raised spiral rib, the cutter may be placed initially in position for cutting to full depth adjacent to one end of the rib and clear of the rib, being rolled gradually into the rib from the advancing end of the latter. But in cases where the work gear teeth form a closed circuit, or where the tooth spaces are cut within the surface of the face gear blank, a depth feed is necessary.

Various modifications from the machine organization here shown may be made within the scope of the invention. These drawings are not intended to show the structural details of a complete commercial machine, but rather to explain the principles of the invention in terms sufficiently full to enable draftsmen familiar with this art to embody such principles in commercially practical form. Hence the drawings are largely diagrammatic and many parts are omitted which would be needed in a commercial machine, but illustration of which is not necessary for the information of the skilled worker in the art of building an operative machine.

It will be readily apparent from the present illustration that, with the cutter, work and work holder in the position shown in Fig. 3, reciprocation of the cutter causes the latter to move across a zone of the work piece W near the axis thereof. A rib $r$ projecting from such zone across the nearer side of the cutter path is intersected and cut by the cutter. Shaft 27, through the worm and wheel gearings 22—23 and 21—20, rotates the cutter and the pinion 18 at harmonious speeds. These speeds may be identical, and they are identical when a pinion 18 of the same diameter and having the same number of teeth as the cutter is used. Said pinion rotates the work spindle 15 by its coaction with the master gear 17, and thereby rotates the gear blank W at the same angular speed. Such simultaneous rotation of the cutter and work, occurring while the cutter is rapidly reciprocating, causes the cutter to generate and cut teeth in the protruding rib $r$ conjugate to the tooth outlines at the cutting edges of the cutter, and to all other gears having teeth of the same pitch and pressure angle. The spacing of the teeth cut in the work piece is the same as that of the master gear teeth.

Teeth of a given pitch may be cut with the use of a master pinion 18 of larger or smaller pitch diameter than the cutter and having a larger or smaller number of teeth; or when the gear ratio between the master pinion and gear is different from that between the cutter and work gear, provided only that the speed ratio of the worm-gear couple 21—20 to the couple 22—23 is established in correct proportion. Conversely, work gear teeth with different pitch spacing from that of the master gear 17 may be cut by suitably speeding the master gear 17 and spindle 15. Change gears of suitable values for such purpose may be interposed in the drive from shaft 27 to worm 21, or to worm 22, according to known principles. Provisions are made for substituting different master gears and pinions for one another, the master gear being located and secured on the shaft 15 by a dowel 51 and a removable screw 52; the pinion 18 being made accessible for removal and substitution of other pinions by removal of a bearing 53 in which the lower end of shaft 19 is held for operation.

As the work rotates, the work holder 10 is progressively lowered by gravity under control of the cam 30 which, as previously stated, is rotated at a fixed speed ratio to the rotation of the cutter and a correlated speed ratio to the master gearing; and has a surface shaped to maintain the teeth of the master gear always at the same height as they pass through the pitch point with the master pinion. The master gear 17 and workpiece rotate at constantly changing angular velocities when the master pinion 18 is turned at uniform angular velocity because the distance of the pitch point from the center of the master gear is continuously changing. This factor is taken into account in designing the form of the cam.

Figures 5, 6:
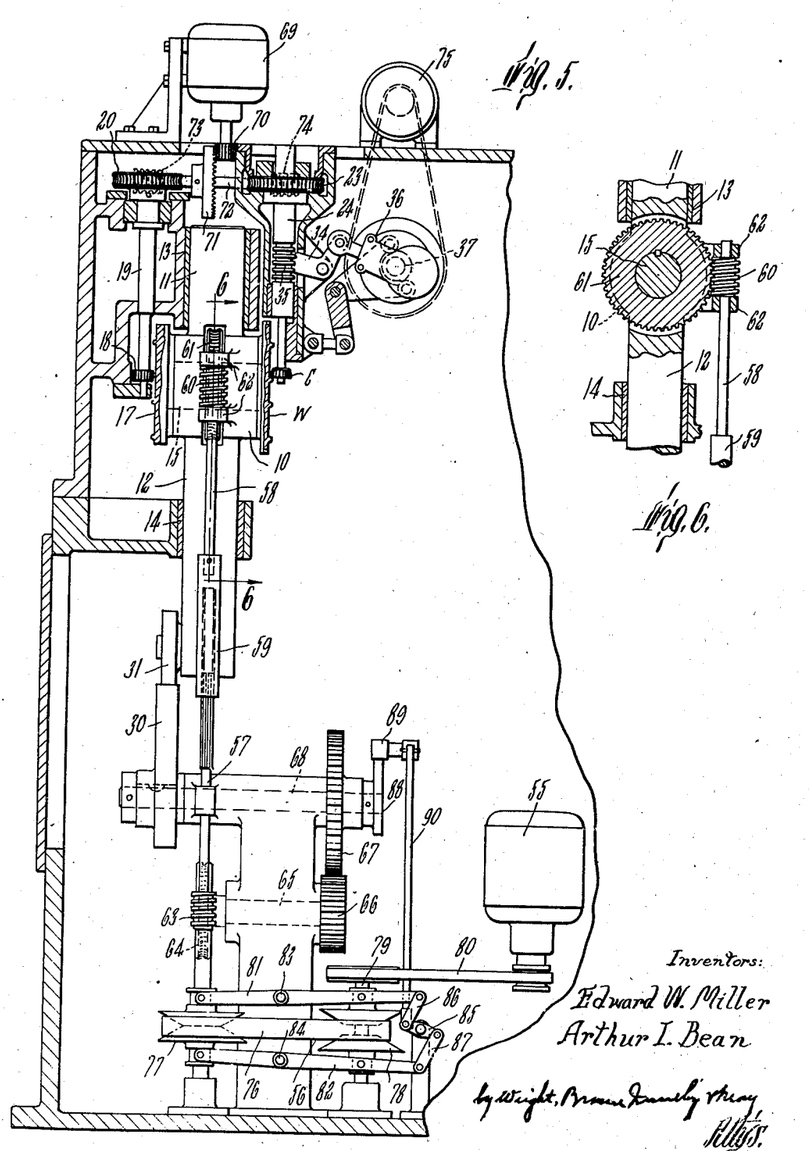
Fig. 5 is a partial sectional view of another form of machine adapted to accomplish the same result.
Fig. 6 is a detail sectional view taken on line 6—6 of Fig. 5.

Another embodiment of the invention is shown in Figs. 5 and 6. This in principle is substantially like that first described, but differs principally in the manner whereby the rotation of the master gear, work piece, and cutter are controlled. Instead of driving the master gear and work piece by means of a master pinion, the master gear is independently driven and controls the rotation of the master pinion and cutter.

In this case, as in the previous one, the work piece W and master gear 17 are mounted on the opposite ends of a work spindle or shaft 15 rotating in a work holder 10 which reciprocates in guides 13 and 14, having extensions 11 and 12 fitting the guides, and is supported by a cam 30 through a cam follower roll 31 connected to the extension 12 of the work carrier. But the shaft 15 and cam are rotated at constant speed ratio, and the cam face is designed accordingly. Driving power is furnished by a motor 55 acting through a variable speed transmission 56 and shaft 57. A shaft 58 is alined with shaft 57 and coupled thereto by a sliding splined coupling 59 to allow for rise and descent of the work holder. Shaft 58 carries a worm 60 which meshes with a worm wheel 61 secured to shaft 15, and is held in continuous mesh with the worm wheel during up and down movement of the holder 10, by bearings 62 on said holder. Shaft 57 rotates cam 30 through a worm 63 on the shaft, a worm wheel 64 on shaft 65, change gears 66, 67 and shaft 68 on which both the cam and the gear 67 are secured.

Torque tending to rotate the master pinion 18 and cutter C is applied by a torque motor 69 through a pinion 70 and face gear 71 to a shaft 72 on which worms 73 and 74 are secured in mesh respectively with worm wheel 20 on the pinion shaft 19 and worm wheel 23 on the cutter spindle 24. The pinion 18, although driven by the motor 69, turns only as fast as is permitted by the independently rotated master gear 17. This arrangement better controls the rotation of the pinion and cutter, as the torque in the shaft 19 is constant. There is no backlash in the rotation of the pinion. The cutter of course rotates at the rate established by the two worm and wheel gear pairs 73—20 and 74—23. Ordinarily its rate of rotation is equal to that of the master pinion, but this is not an essential condition.

The cutter is reciprocated and backed off, for relief on noncutting strokes, by a motor 75 acting through means substantially like those shown in Miller Patent 2,107,543, February 8, 1938, and in principle the same as the corresponding means shown in Fig. 3.

The variable speed transmission drive 56 is provided to make the number of strokes of the cutter per revolution uniform at all times, or as nearly so as feasible. Assuming that the motor 75 runs at constant speed, then if the master gear were also rotated at constant angular velocity, the cutter would make fewer strokes per rotation while cutting the outer parts of a spiral line of teeth than when cutting the parts nearer the axis. Therefore the transmission drive is constructed and operated to rotate the work and master gear at slower angular velocities when teeth of the master gear more remote from the axis are in mesh with the pinion 18 than when teeth nearer the axis are in mesh with the pinion. The transmission here shown is of the V belt and pulley type having a belt 76 of V section passing around a pulley 77, composed of separable cones splined to the shaft 57, and a similar pulley 78 splined to a shaft 79 driven from the motor 55 by a belt 80. The members of pulley 78 are brought together, and the members of the pulley 77 spread apart during descent of the work holder by levers 81 and 82 which are swung about their fulcrum pivots 83 and 84 respectively by an operating lever 85 and links 86 and 87. Said operating lever is shifted in time with the travel of the work holder by a cam 88 secured to shaft 68 and acting through a cam follower 89 and connecting rod 90.

This is one of a number of different means which may be used for the same purpose within the scope of the invention. Conversely, a like or equivalent variable speed transmission may be interposed between the motor 75 and the mechanism which reciprocates the cutter and may be timed with the travel of the work holder to reduce or increase the rate of reciprocation of the cutter spindle. Or the speed of either the motor 55 or motor 75, or both, may be appropriately varied during the travel of the work holder to the same end. Such motors may be electric or hydraulic or of any other suitable character, all within the scope of the invention.

Figures 7, 8:
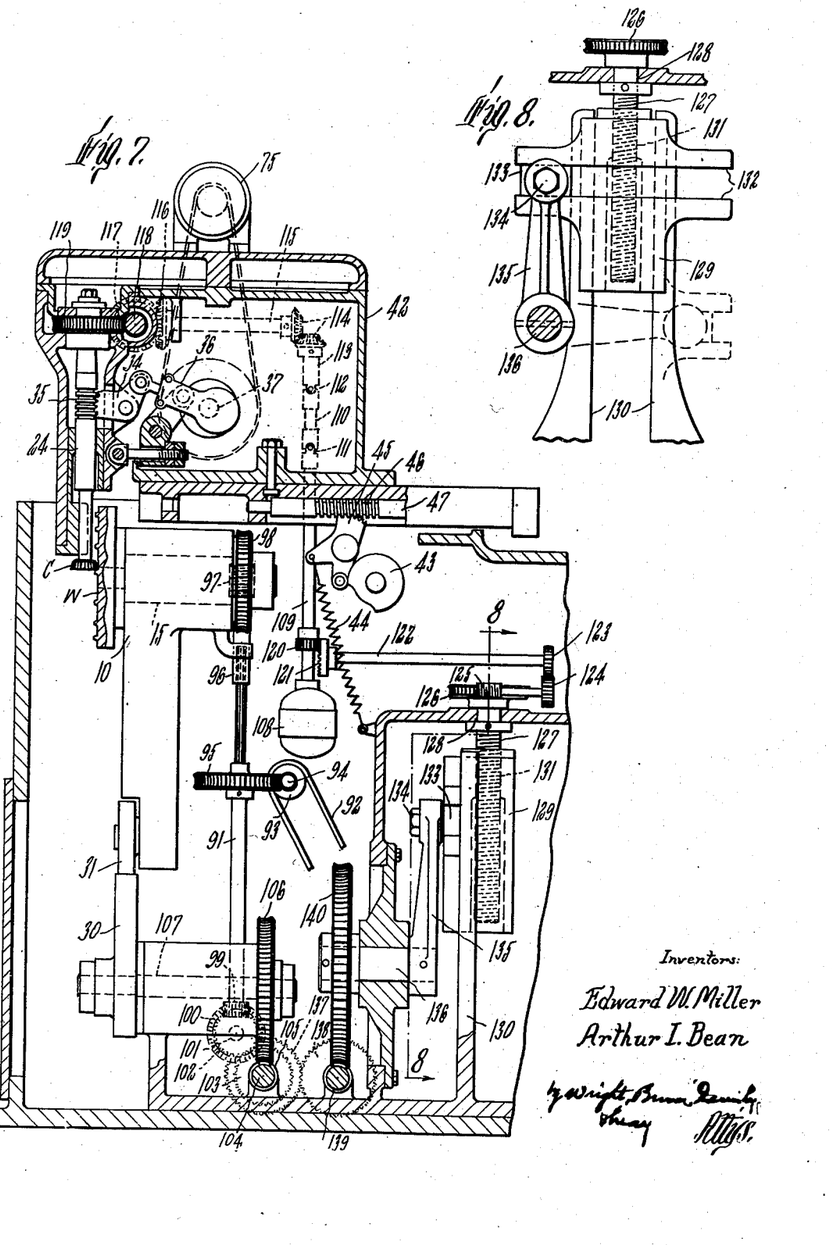
Fig. 7 is a vertical sectional view of still another form of machine for accomplishing the same result.
Fig. 8 is a detail sectional view taken on line 8—8 of Fig. 7.

A third form of the invention is illustrated in Figs. 7 and 8. Here the master gear is omitted and the linear rotational speed of the cutter is equalized with that of the work piece at different distances from its axis by other means timed with the travel of the work holder.

The cutter spindle is reciprocated and backed off by a motor 75 acting through means substantially like those shown in Fig. 5, all mounted in a carriage 42 which is supported slidingly on the machine base and is associated with depth feed means substantially like that shown in Fig. 3 and previously described, but arranged to operate in the opposite direction.

The work spindle 15, like those of the previous embodiments, is supported in a slide 10 which is reciprocable vertically in guideways (not here shown) and is raised or lowered by a cam 30 of the same nature as those previously described.

The work spindle and cam are driven simultaneously at the prescribed speed ratio by a shaft 91 which, in turn, is driven by a prime mover. For the present explanation, it may be assumed that such prime mover is an electric or other motor (not shown) mounted conveniently in or on the machine base, geared to the shaft 91 by a belt and pulley drive 92, 93, a worm 94 connected to the pulley, and a worm gear 95 secured to the shaft 91 and meshing with said worm. Shaft 91 is connected through a splined sliding coupling 96 with a worm 97 which meshes with a worm gear 98 on work spindle 15. Shaft 91 carries a pinion 99 in mesh with a face gear 100 on a shaft 101 which, through change gears 102 and 103, drives a shaft 104 and a worm 105 on said shaft meshing with a worm gear 106 secured to the cam shaft 107.

The cutter is rotated by a torque motor 108 through shaft 109, telescopic shaft section 110, universal joints 111 and 112, shaft section 113 supported in carriage 42, bevel gear pair 114, shaft 115, bevel gears 116 and 117, worm 118, and worm gear 119; the latter surrounding the cutter spindle 24 and being engaged therewith by rotation-transmitting guides of the type previously described. The speed of such rotation is restrained and correlated with that of the work by the following mechanism.

Shaft 109 carries a pinion 120 which, through face gear 121, shaft 122, change gears 123, 124, worm 125 and worm gear 126, tends to rotate a screw 127, confined against endwise movement, but rotatable, in a bearing 128. A slide 129 is engaged with a guide 130 so as to be movable in alinement with screw 127 and is provided with an internally threaded portion 131 with which the screw 127 meshes. Thus the cutter spindle can rotate only when the screw 127 is permitted to rotate by displacement of slide 129, and its speed of rotation is governed by the speed of displacement of the slide.

Such displacement is caused, or permitted, to occur in the direction in which screw 127 tends to displace the slide, by the work-spindle rotating means, at a varying rate timed with the rotation of the work spindle. The slide 129 is formed with a transverse guideway 132 in which is fitted slidingly a block 133 connected by a pivot 134 with an arm 135 secured to a shaft 136, to which rotation is imparted from worm shaft 104 by ratio gears 137 and 138, a worm 139 and a worm gear 140 secured to the shaft 136. In short, there is a positive train of gearing between shaft 91 and shaft 136, which causes arm 135 to revolve at a definite predetermined ratio to the rotation of the work. As the arm swings from a position in which it is, say, parallel to the path of slide 129 (the position shown in full lines in Fig. 8), to a position at right angles to said path (shown by broken lines in Fig. 8), it allows the slide to advance at an increasing rate of speed. When the guideway 132 is straight and perpendicular to said path, as shown in Fig. 8, the speed range is from zero to the full linear speed of pivot 134, and the rate of increase is proportional to the versed sine of the increasing angle which the arm makes with said path. Then, assuming that the action is started with the work spindle axis at the height of the cutter, that the work holder descends from this position, and that the arm 135 swings clockwise from the full line toward the broken line position of Fig. 8, the cutter will be rotated at increasing speed as points of the work piece more remote from the axis are brought beside the cutter.

The bounding faces of guideway 132 are, in effect, cam surfaces. Those here shown are designed for one specific spiral gear. For other face gears the cam surfaces 132 are appropriately modified conformably with the required speed ratios; or a cam of appropriate contours is substituted for the arm 135 and is engaged with a follower on the slide 129, similarly to the arrangement between the cam 30 and the work holder. By the design and selection of suitable cams, a wide variety of face gears with non-circular lines of teeth can be made by original generation.

All embodiments of the invention contain the combination of a rotatable cutter spindle carrying a cutter, which spindle is operable to impart cutting and generating components of motion to the cutter, and a work spindle, with means for effecting a relative displacement between the work spindle and cutter spindle such as to bring portions of the work piece at different distances from the work spindle axis within the range of action of the cutter. They include means for simultaneously rotating the cutter and work spindles and means for varying the angular velocity of one spindle relatively to the other concurrently with such relative displacement, in such manner as to effect equality, or such other ratio as may be desired, of linear pitch line velocity of the cutter with the linear velocity of that part of the work piece which is nearest to the cutter. The means for the latter purpose of the first and second forms herein described are alike in that they include a master gear and transmission connections between the master gear and work spindle. The second and third forms are alike in that the work spindle and cutter spindle are rotated by different agencies and the rotational speed of the cutter spindle is varied by means timed with the relative displacement between the work spindle and the cutter. In these two last-mentioned forms the master gear and the slide 129 are generically equivalent in being devices for restraining the rotation of the cutter spindle and causing its speed to be varied proportionally to the varying distances from the work spindle of different parts of the work piece on which the cutter acts.

The invention, however, is not limited to the forms and designs of machines here illustrated, for many variations may be made in the construction and arrangement of the parts, and equivalent means may be substituted for imparting motion to the movable parts. For instance, by suitable reversals, the movement of relative displacement for cutting parts of the work at different distances from its center may be given to the cutter-supporting and -carrying means (and likewise to the speed correlating means where master gearing is used) instead of to the work holder. And, as previously noted, by arranging the work spindle axis parallel to the cutter axis (or vice versa), and approximately varying the distance between the spindle axis and cutter, gears of cylindrical type may be generated with teeth in spiral, or other non-circular arrangement. By "gear of cylindrical type" in this description, we mean gears of which the teeth are located on the periphery of a disk or plate, or on the interior of a ring; as distinguished from face gears. The cylindrical type, within this definition, includes irregular gears of which the teeth do not lie in a closed circuit, as well as those which do.

Neither is the invention limited for all purposes to the employment of a gear shaped planing cutter as the operating tool, or to the employment of a reciprocable spindle as the means for giving the cutter its cutting movements; since, for cutting some gears in which the lines of teeth are not too close together, or do not extend too near to the axis of the work piece, a generating hob such as that shown in Patent No. 2,304,586, granted December 8, 1942, on the application of Edward W. Miller Serial No. 370,212, filed December 14, 1940, may be used. Such a hob, when employed for the purpose, is mounted on a spindle which extends transversely to the path of relative displacement between the work spindle and cutter, instead of parallel to such path, but its speed of rotation, or that of the work spindle, is controlled by means substantially like those herein described to harmonize the displacement of the hob teeth due to their helical arrangement with the linear velocity of portions of the work piece at different distances from the axis thereof.

What we claim and desire to secure by Letters Patent is:

1. A machine for generating face gears with teeth located at relatively different distances from its axis, comprising a work holder, a work spindle mounted rotatably in said holder and having means for securing a face gear blank with its face substantially perpendicular to the rotational axis of the spindle, a cutter spindle and a tooth-generating cutter secured thereto mounted rotatably with the cutter in position to incise a gear blank secured to the work spindle, means for imparting cutting and generative components of movement to said cutter spindle and cutter, said generative component of movement, as to the side of the cutter next to the gear blank, being tangential to the axis of the work spindle, said work holder and the cutter being relatively displaceable in a path transverse to the axis of the work spindle and extending in the general direction of the cutting component of movement of the cutter, means for effecting such relative displacement and means for rotating the work spindle and correlating its angular velocity with that of the cutter spindle to effect equality of the tangential components of motion of the cutter and gear blank which are nearest to one another.

2. A machine for generating a face gear with teeth at different distances from its axis, comprising a rotatable and endwise reciprocable cutter spindle, a gear shaped planing cutter secured to said spindle, means for reciprocating said spindle between prescribed limits of motion, a work spindle holder supported and guided to move in a path substantially parallel to the cutter spindle, a work spindle mounted rotatably in said holder with its axis transverse to said path and having means for securing a face gear blank with one face thereof substantially perpendicular to the axis of the work spindle and in position to be incised by the cutter, a cam engaged with said holder, means for propelling said cam to effect displacement of said holder in its prescribed path, and means for rotating the cutter and work spindles with a varying angular velocity ratio proportional to the varying distances from the axis of the gear blank of different points on the face of the gear blank which are brought between the limits of reciprocation of the cutter by virtue of the cam controlled movement of said holder.

3. A machine for generating a face gear with teeth at different distances from its axis, comprising a rotatable and endwise reciprocable cutter spindle, a gear shaped planing cutter secured to said spindle, means for reciprocating said spindle between prescribed limits of motion, a work spindle mounted rotatably on an axis transverse to the axis of the cutter spindle and having means for securing a face gear blank with a face thereof substantially perpendicular to the axis of the work spindle and in position to be incised by the cutter, the work spindle being displaceable in a path substantially parallel to the cutter spindle to bring points of the face gear at different distances from the axis thereof within the range of cutting traverse of said cutter, means for so displacing the work spindle, and means for rotating the cutter and work spindles at varying speed ratios proportional to the varying distances from the axis of the work spindle of different points on the face gear blank which are so brought within the range of the cutter.

4. A machine for generating face gears of which different teeth of the same gear are at different distances from the axis of the gear, comprising a linearly movable work holder, means for supporting a face gear blank on said work holder rotatably with the face in which teeth are to be cut substantially perpendicular to the axis thereof, a cam engaged with said holder and organized to control the movement thereof in its prescribed path, a cutter arranged contiguous to the face of a gear blank mounted on said holder and constructed to generate face gear teeth when it and the work gear are rotated about their respective axes at harmonious speeds, means for driving said cam to cause displacement of the work holder whereby points of the work piece at different distances from the axis thereof are successively brought into cutting proximity to the cutter, and means for simultaneously rotating the cutter and work piece, and correlating their rotation in harmony with the varying distances from the gear blank axis of points on the gear blank face which are successively brought to the cutter.

5. A face gear generating machine comprising a supporting structure, a tooth generating cutter and means for imparting cutting and generating components of motion to it mounted on said supporting structure, a gear blank holder having means for supporting a face gear blank to rotate about an axis substantially perpendicular to its face, and with its face in a location to be acted on by said cutter, the holder being mounted movably on the supporting structure with provisions for displacement in a path which brings points on the gear blank face at different distances from the axis thereof into propiniquity with the cutter, and correlated mechanisms for effecting such displacement of said holder and for simultaneously rotating the gear blank, said mechanisms including means by which the speeds of such displacement and rotation are so related as to cause a zone of the gear blank face, non-concentric with the axis thereof, to be moved past and in cutting engagement with the cutter.

6. A face gear generating machine comprising a supporting structure, a tooth generating cutter and means for imparting cutting and generating components of motion to it mounted on said supporting structure, a gear blank holder having means for supporting a face gear blank to rotate about an axis substantially perpendicular to its face, and with its face in a location to be acted on by said cutter, the holder being mounted movably on the supporting structure in guided engagement therewith for displacement in a path which brings points on the gear blank face at different distances from the axis thereof into propinquity with the cutter, and correlated mechanisms for effecting such displacement of the holder and for simultaneously rotating the gear blank at relative rates of speed such as to cause a zone of the gear blank face, non-concentric with the axis thereof, to be moved past and in cutting engagement with the cutter, combined with means for correlating the generative component of motion of the cutter with the rotational velocity of the gear blank in proportion to the distances from the axis of the blank of the different points in the face thereof on which the cutter acts.

7. A machine for generating face gears with teeth in non-circular arrangement about the axis of the gear, comprising a work spindle having means for securing a face gear blank, a master face gear having teeth arranged similarly to the prescribed arrangement of teeth to be cut in the blank, a cutter having teeth with cutting edges in outlines conjugate to the prescribed forms of teeth to be cut in the gear blank mounted in cutting proximity to the face of a gear blank secured to said spindle, means for imparting to said cutter and the teeth thereof cutting and generating components of movement with respect to such gear blank, a pinion meshing with the teeth of said master gear, transmission mechanism between said pinion and cutter organized to correlate the rotational speed of the pinion with the speed of the generative component of motion of the cutter simultaneously with rotation of the work spindle and master gear, and means for effecting displacement of said spindle and master gear with respect to said pinion and cutter at a rate correlated with the rotational speed of the spindle such as to bring successive teeth of the master gear which are at different distances from the axis of the spindle into meshing relation with the pinion and to bring corresponding points of a gear blank secured to the spindle into cutting relation with the cutter.

8. A machine of the character described comprising an endwise reciprocable and rotatable cutter spindle, a gear shaped planing cutter secured to said spindle, a work spindle mounted with its axis transverse to that of the cutter spindle having means for supporting a face gear blank with the end face thereof in cutting proximity to said cutter, a master face gear secured to the work spindle and having teeth in a line non-concentric with the axis thereof, a pinion meshing with the teeth of said master gear, means for simultaneously rotating said pinion, master gear and work spindle, means for displacing the work spindle and master gear in a direction and at a rate of speed correlated with the rotational speed of the spindle and the disposition of the teeth of the master gear such as to maintain the master gear teeth in mesh with the pinion, and connections between the pinion and cutter spindle organized to maintain a prescribed ratio of angular speeds between them.

9. A machine for generating spiral face gears comprising a work spindle holder mounted and guided for rectilinear movement, a work spindle rotatably mounted in said holder with its axis transverse to the path of movement thereof having means for securing a face gear blank, a master gear having a spiral line of teeth, a pinion meshing with said master gear, means for rotating the pinion and work spindle, a cam engaged with the spindle holder for controlling the rectilinear movement thereof, and means for rotating the cam, said cam having a surface so related to the arrangement of the master gear teeth and to the speeds of rotation of the work spindle and cam as to bring successive teeth of the rotating master gear into correct mesh with the pinion.

10. A machine for cutting spiral face gears comprising an endwise reciprocable and rotatable cutter spindle, a gear shaped planing cutter mounted on said spindle, a work spindle, a work spindle holder mounted movably in a path substantially parallel to the axis of said cutter spindle, a work spindle mounted rotatably in said holder with its axis transverse to the path of movement thereof having means for holding a face gear blank with an end face thereof in cutting proximity to the cutter, a spiral master gear secured to the work spindle in coaxial alinement with the gear blank, a pinion mounted rotatably on an axis parallel to the cutter spindle axis in mesh with the teeth of the master gear, means for rotating said pinion and cutter spindle simultaneously about their respective axes at a predetermined speed ratio, and means for displacing the work spindle holder in its path at a rate correlated with the rotational speed of the work spindle and the radial distances of successive master gear teeth from the axis of the spindle, so as to maintain the master gear teeth in correct mesh with the pinion and bring a corresponding spiral zone of the work gear blank into cutting relation to the cutter.

11. A machine according to claim 10, in which the means for shifting the work spindle holder comprises a cam and means for propelling the cam; the surface of the cam being a spiral proportional to the spiral line of the master gear teeth and to the velocity ratio of the work spindle and cam.

12. A machine for generating face gears of which the teeth are at varying distances from the axis, comprising a work spindle having means for holding a face gear blank, a holder for said work spindle movable in a path transverse to the axis of the spindle, a generating cutter located in position to cut the face of a gear blank held by said holding means and having teeth arranged to travel with a component of movement contiguous to the face of the gear blank and tangential to a circle concentric with the axis of the blank, means for rotating the work spindle, means for shifting the spindle holder in its prescribed path at a rate correlated with the rate of spindle rotation such that a prescribed non-circular zone of the work piece is traversed past the cutter in cutting relation thereto, and means controlled by the spindle rotating means for imparting to the cutter the generative component of its cutting action at a rate of speed in harmony with the speed of traverse past the cutter of that portion of the before named zone which is next adjacent to the cutter.

13. A machine for generating face gears of which the teeth are at varying distances from the axis, comprising a work spindle having means for holding a face gear blank, a holder for said work spindle movable in a path transverse to the axis of the spindle, a generating cutter located in position to cut the face of a gear blank held by said holding means and having teeth arranged to travel with a component of movement contiguous to the face of the gear blank and tangential to a circle concentric with the axis of the blank, means for rotating the work spindle, means for shifting the spindle holder at a rate correlated with the rate of spindle rotation such that a prescribed non-circular zone of the work piece is traversed past the cutter in cutting relation thereto, a driver coupled with the cutter tending to impart thereto the generative component of its movement at a rate faster than that of the nearest adjacent point of said zone, and means in timed relation with the rotation of the work spindle for restraining the speed of said generative component to a predetermined ratio with respect to the speed of the gear blank.

14. A spiral face gear generating machine comprising a work spindle having means for holding a face gear blank, a holder for said spindle movable in a path transverse to the axis of the spindle, a gear shaped cutter and a cutter spindle to which the cutter is secured mounted for endwise reciprocation substantially parallel to the path of the work spindle holder, and for rotation, in a location near to the work spindle such that the cutter is enabled to cut tooth spaces in the end face of a gear blank secured to the spindle, means for reciprocating said cutter spindle, means for rotating the work spindle, means for simultaneously displacing the work spindle holder in its path at a rate correlated with the rate of rotation of the work spindle to bring a prescribed non-circular zone of the gear blank into progressive cutting relation to the cutter, driving means coupled with the cutter spindle for rotating the same and tending to carry the cutter teeth in their generating component of movement faster than the contiguous part of the before named zone of the work piece, and means for restraining the cutter spindle rotation to a rate in harmony with the linear travel of said contiguous part of said zone.

15. A gear generating machine as set forth in claim 14, in which the means for restraining the cutter spindle rotation comprises a master gear secured to the work spindle having teeth arranged in a line similar to the before named zone, a pinion in mesh with said master gear, and transmission gearing between said pinion and the cutter spindle.

16. A gear generating machine as set forth in claim 14, in which the means for restraining the rotation of the cutter comprises a screw geared to rotate at a given ratio to the cutter spindle rotation, a linearly movable slide with which said screw is in screw threaded engagement, and means for causing displacement of said slide at a rate proportional to the linear speed of the portion of the work gear blank next adjacent to the cutter and in a direction to permit rotation of said screw.

17. A gear generating machine as set forth in claim 14, combined with a variable speed transmission mechanism for correlating the linear speed of the part of the work piece next adjacent to the cutter with the speed of reciprocating movement of the cutter.

18. A machine for generating gears of which successive teeth are located at different distances from the axis of the gear, comprising a rotatable and endwise reciprocable cutter spindle, a gear-shaped planning cutter secured to said spindle, means for reciprocating said spindle and cutter between prescribed limits, a linearly movable work-holder, means for supporting a gear blank rotatably on said holder, the holder being guided to move in a path which changes the distance between the axis of the gear blank and the limits of movement of the cutter, a cam engaged with the holder and organized to control the progress thereof in its prescribed path, means for driving said cam for causing displacement of the work holder whereby points of the gear blank at different distances from the axis thereof are successively brought into cutting proximity to the cutter, and means for simultaneously rotating the cutter and gear blank, and correlating their respective rates of rotation in harmony with the varying distances from the gear blank axis of the portions of the blank which are successively brought to the cutter.

19. A machine for generating gears with teeth in non-circular arrangement around the axis of the gear, comprising a work spindle having means for mounting a gear blank, a master gear having teeth arranged similarly to the prescribed arrangement of teeth to be cut in the blank secured to the spindle, a cutter having teeth with cutting edges in outlines conjugate to the prescribed forms of the teeth to be cut mounted in cutting proximity to the tooth-bearing portion of a gear blank secured to the spindle, means for imparting to said cutter and the teeth thereof cutting and generating components of movement with respect to such gear blank, a pinion meshing with said master gear, transmission mechanism between the pinion and cutter organized to correlate the rotational speed of the pinion with the speed of the generative component of motion of the cutter simultaneously with the rotation of the work spindle and master gear, and means for effecting displacement of the spindle and master gear with respect to the pinion and cutter at a rate correlated with the rotational speed of the spindle such as to bring successive teeth of the master gear which are at different distances from the axis of the spindle into meshing relation with the pinion, and to bring corresponding points of a gear blank secured to the spindle into cutting relation with the cutter.

20. A machine for generating gears with teeth in non-circular arrangement about the axis of such gear, comprising a work spindle holder mounted and guided for rectilinear movement, a work spindle mounted rotatably in said holder, having means for carrying a gear blank, a master gear mounted on the work spindle having teeth in a line non-concentric with the axis thereof, an endwise reciprocable cutter spindle rotatable about its own axis, a gear shaped planing cutter secured to said cutter spindle, a pinion meshing with the teeth of said master gear, means for simultaneously rotating said pinion, master gear and work spindle, connections between the pinion and cutter spindle organized to maintain a prescribed ratio of angular speeds between them, a cam engaged with the spindle holder for controlling the linear movement thereof, and means for rotating the cam; the surface of the cam being so related to the arrangement of the master gear teeth and to the speeds of rotation of the work spindle and cam as to bring successive teeth of the rotating master gear into correct mesh with the pinion and corresponding parts of the gear blank into cutting mesh relation with the cutter.

21. A machine of the character described, comprising an endwise reciprocable and rotatable cutter spindle, a gear shaped planing cutter secured to said spindle, a holder for a face gear blank and a master face gear mounted for linear movement in a path substantially parallel to the axis of the cutter spindle and having means for rotatably supporting a face gear blank to rotate in a plane substantially parallel to said axis in cutting proximity to said cutter, a master face gear mounted rotatably on said holder, driving mechanism constructed and arranged to rotate said blank and gear simultaneously, a pinion meshing with said master gear, driving means associated with said holder for displacing the latter in its prescribed path so that the centers of the face gear blank and master gear are placed at varying distances from said pinion and the cutter, respectively, and means controlled by said pinion in its rotation for rotating the cutter at rates in harmony with the linear speed of points on the face gear blank variously distant from the axis thereof.

22. A machine of the character described, comprising an endwise reciprocable and rotatable cutter spindle, a gear shaped planing cutter secured to said spindle, a holder for a face gear blank and a master face gear mounted for linear movement in a path substantially parallel to the axis of the cutter spindle and having means for rotatably supporting a face gear blank to rotate in a plane substantially parallel to said axis in cutting proximity to said cutter, a master face gear mounted rotatably on said holder, driving mechanism constructed and arranged to rotate said blank and gear simultaneously, a pinion meshing with said master gear, driving means associated with said holder for displacing the latter in its prescribed path so that the centers of the face gear blank and master gear are placed at varying distances from said pinion and cutter, respectively, means controlled by said pinion in its rotation for rotating the cutter at rates in harmony with the linear speed of points on the face gear blank variously distant from the axis thereof, and means operating in harmony with the displacement of the holder for controlling the rates of gear blank and master gear rotation.

23. A machine for generating face gears with teeth arranged in a curved line which is otherwise than concentric with the axis of the gear, comprising a supporting structure, a cutter spindle holding means and a work spindle holding means both mounted on said supporting structure, a cutter spindle mounted to rotate and reciprocate endwise on said cutter spindle holding means, a cutter carried by said spindle and provided with peripheral teeth adapted to perform a cutting action when the cutter is moved lengthwise of the spindle axis in engagement with a work piece, means for reciprocating the cutter spindle and cutter in a path of limited length, a work spindle mounted rotatably on said work spindle holding means with its axis transverse to the cutter spindle, located and having means for carrying a face gear blank in operative relation to the cutter, one of said holding means being movable transversely in the direction of the cutter reciprocation so as to alter the distance between the axis of the work spindle and the limits of movement of the cutter, and driving mechanism including machine elements organized to rotate the cutter, other machine elements organized to rotate the work spindle, other machine elements organized to cause displacement of said translatively movable holding means, and correlating means for controlling the relative speeds of said machine elements whereby to cause a noncircular zone of the work piece to pass the cutter and teeth to be generated in such zone.

24. In a face gear generating machine having a supporting structure, a cutter spindle mounted on said supporting structure to rotate about its axis, a cutter secured to said spindle having peripheral teeth and means for imparting movements to said spindle such as to cause the cutter teeth to have generative and cutting components of movement in action on a work piece presented in operative relation to said teeth; a work spindle holder, a work spindle rotatably carried by said holder and having provisions for securing a face gear blank with the face thereof in which teeth are to be generated substantially perpendicular to the axis of rotation of the work spindle, said holder being mounted on the supporting structure and guided to move in a path transverse to the axis of the work spindle in a location such that points on the face of such a gear blank at different distances from the axis of the work spindle are brought into operative propinquity with the cutter in consequence of movements of the holder, mechanism organized to cause the holder to be displaced along its prescribed path of movement, mechanism for rotating the work spindle, and means for correlating the actions of said mechanisms so that a prescribed zone on the face of the gear blank which is otherwise than concentric with the axis of the work spindle is caused to travel past the cutter at a prescribed speed ratio with respect to the generative component of movement of the cutter.

EDWARD W. MILLER.
ARTHUR I. BEAN.